(12) United States Patent
Matsumoto et al.

(10) Patent No.: US 11,484,046 B2
(45) Date of Patent: Nov. 1, 2022

(54) PACKED BEVERAGES SUPPRESSED IN THE FADING OF DYES

(71) Applicant: SUNTORY HOLDINGS LIMITED, Osaka (JP)

(72) Inventors: Takehiro Matsumoto, Kanagawa (JP); Takahiro Ohira, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 331 days.

(21) Appl. No.: 16/635,272

(22) PCT Filed: Aug. 1, 2018

(86) PCT No.: PCT/JP2018/028773
§ 371 (c)(1),
(2) Date: Jan. 30, 2020

(87) PCT Pub. No.: WO2019/026933
PCT Pub. Date: Feb. 7, 2019

(65) Prior Publication Data
US 2021/0015124 A1    Jan. 21, 2021

(30) Foreign Application Priority Data

Aug. 2, 2017   (JP) .............................. JP2017-150152

(51) Int. Cl.
*A23L 2/44* (2006.01)
*A23L 5/43* (2016.01)
*A23L 2/58* (2006.01)

(52) U.S. Cl.
CPC .................. *A23L 2/44* (2013.01); *A23L 2/58* (2013.01); *A23L 5/43* (2016.08); *A23V 2002/00* (2013.01)

(58) Field of Classification Search
CPC ..... A23L 2/44; A23L 5/43; A23L 2/58; A23V 2002/00
USPC ................ 426/615, 429, 250, 262, 270, 425
See application file for complete search history.

(56) References Cited

U.S. PATENT DOCUMENTS

2017/0130179 A1    5/2017  Kageyama et al.

FOREIGN PATENT DOCUMENTS

| EP | 1752498 A1 | 2/2007 |
|---|---|---|
| EP | 2172537 * | 6/2014 |
| JP | H11-75790 A | 3/1999 |
| JP | 2000-83654 A | 3/2000 |
| JP | 2002-363557 A | 12/2002 |
| JP | 2003-105337 A | 4/2003 |

(Continued)

OTHER PUBLICATIONS

Sun-Brewed Rosemary Tea, www.bhg.com/recipe/drinks/sun-brewed-rosemary-tea, pp. 1-2. (Year: 2011).*

(Continued)

*Primary Examiner* — Helen F Heggestad
(74) *Attorney, Agent, or Firm* — Faegre Drinker Biddle & Reath LLP

(57) ABSTRACT

The present invention aims at providing packed beverages in which the effect of rosmarinic acid for suppressing the fading of dyes is maintained and yet any undesirable flavor that is characteristic of rosemary extracts as exemplified by their undesirable smell or aftertaste is suppressed. To this end, the contents of cineole and camphor are reduced.

13 Claims, 4 Drawing Sheets

(56) References Cited

FOREIGN PATENT DOCUMENTS

JP        2016-15938 A        2/2016
WO    WO2012/033536    *    3/2012

OTHER PUBLICATIONS

Beer Advocate, "More Beer", pp. 1-7, www.beeradvocate.com/beer/profile/850/54000/. (Year: 2009).*

Hanson, R. "Rosemary, the beneficial chemistry of a garden herb", Science Progress (2016), 99(1), 83-91 . (Year: 2016).*

International Search Report dated Nov. 6, 2018 for PCT/JP2018/028773.

European Patent Office, Extended European Search Report for European Patent Application No. 18841163.1, dated Mar. 4, 2021.

Tomi, K., et al., "Enantioselective GC-MS analysis of volatile components from rosemary (*Rosmarinus officinalis* L.) essential oils and hydrosols," *Bioscience, Biotechnology, and Biochemistry*, 2016, 80(5): 840-847.

Rein, M. J., et al., "Stability and Enhancement of Berry Juice Color," *J. Agric. Food Chem.*, 2004, 52(10): 3106-3114.

\* cited by examiner

US 11,484,046 B2

PACKED BEVERAGES SUPPRESSED IN THE FADING OF DYES

CROSS REFERENCES TO RELATED APPLICATIONS

This application is the National Stage of International Application No. PCT/JP2018/028773 filed Aug. 1, 2018, and claims benefit of Japanese Application No. 2017-150152 filed on Aug. 2, 2017.

TECHNICAL FIELD

The present invention relates to beverages that are suppressed in the fading of dyes and which yet retain their inherent good flavor. More specifically, the present invention relates to beverages that contain rosmarinic acid and linalool while having reduced contents of cineole and camphor.

BACKGROUND ART

Some beverages have colors originating from their feedstock while others have been artificially colored by various methods; color shades are a very important element for supplying beverages of high added value to consumers. Dyes that constitute colors sometimes fade. Especially, irradiation with sunlight, fluorescent lamps, LED lamps and other lights is known to cause fading of dyes.

To prevent dyes in foods from changing in color or fading, a variety of measures are being studied. For example, antioxidants that inhibit the oxidation of dyes are known to be effective for suppressing the fading of dyes (Patent Document 1). For the purpose of incorporation in colored beverages, synthetic food additives such as antioxidants are not preferred and it is desirable to use extracts (foods) as obtained from naturally occurring substances which contain not only antioxidants but also other unremoved ingredients that are beneficiary to alcoholic beverages. Among ingredients of natural origin, plants of the mint family Lamiaceae, for example, are known to contain antioxidant components, and it is also known that an extract of rosemary which is a plant of the mint family contains antioxidant components (Patent Document 2). Rosemary (*Rosmarinus officinalis*) is a kind of herb which, due to its characteristic aroma, is known as a spice that is used to impart a taste or aroma to meat meals and other foods (Patent Document 3); in addition, rosemary is sometimes used as an agent for preventing the fading of dyes in foods (Patent Document 4).

CITATION LIST

Patent Literature

Patent Document 1: JP H8-112076A
Patent Document 2: JP 2003-105337A
Patent Document 3: JP 2007-312752A
Patent Document 4: WO 2016/006552

SUMMARY OF INVENTION

Technical Problem

Among beverages, those which are colored are often poured into transparent glasses or otherwise served for drinking, and not only their aroma and taste but also their color shade may well be described as an important element that affects their preference. In the case of packed beverages, however, which can be stored for a certain prolonged period of time and which, therefore, may sometimes fade to deteriorate depending on storage conditions such as exposure to light rays when they are placed indoors for decoration, and this will lead to a lowered commercial value.

Containing rosmarinic acid, rosemary extracts have a comparatively strong anti-oxidizing power and are known to ensure that dyes in foods can be effectively inhibited from fading. However, if used in amounts that are capable of providing the effect of preventing the fading of dyes, rosemary extracts which are a kind of herbal spices have often imparted their characteristic taste or smell to the foods in which they are used.

It has therefore been desired to develop a means that can suppress the fading of dyes in packed beverages while retaining their inherent good flavor.

An object, therefore, of the present invention is to provide packed beverages in which the effect of rosmarinic acid for suppressing the fading of dyes is maintained and yet any undesirable flavor that is characteristic of rosemary extracts as exemplified by their undesirable smell or aftertaste is suppressed.

Solution to Problem

As a result of intensive studies made with a view to solving the above-mentioned problems, the present inventors found that the contents of cineole and camphor contained in rosemary are associated with the undesirable smell or aftertaste which is characteristic of rosemary. The present inventors further found that a packed beverage containing rosmarinic acid and having reduced contents of cineole and camphor was capable of inhibiting the fading of dyes while retaining the inherent good flavor of the beverage.

Thus, the present invention encompasses, but is not limited to, the following embodiments.

1. A packed beverage that contains rosmarinic acid, linalool and a dye component, wherein the ratio of the sum concentration by weight of camphor and cineole to the concentration by weight of rosmarinic acid is not more than 0.10 whereas the ratio of the concentration by weight of linalool to the concentration by weight of rosmarinic acid is at least 0.00001.
2. A packed beverage which contains a liquid rosemary extract and a dye component, the liquid rosemary extract being obtained by a method comprising:
   a step of immersing a rosemary's plant body in an aqueous solution containing 0 to 5% by volume of ethanol for a given period of time at 0 to 60° C. to obtain an immersion fluid; and
   a step of removing the rosemary's plant body from the immersion fluid to obtain a supernatant.
3. The beverage as recited in 2 above, wherein the ethanol content of the aqueous solution is at least 0% by volume but less than 3% by volume.
4. The beverage as recited in 2 or 3 above, wherein the method further includes the step of concentrating the supernatant and wherein the concentration ratio is by a factor of at least 10.
5. The beverage as recited in any one of 2 to 4 above, wherein the volume of the aqueous solution used in the immersion step is more than 0 times but not more than 20 times the weight of the rosemary's plant body.
6. The beverage as recited in any one of 2 to 5 above, wherein the ratio of the sum concentration by weight of camphor and cineole to the concentration by weight of rosmarinic acid is not more than 0.10 whereas the ratio of the concentration by weight of linalool to the concentration by weight of rosmarinic acid is at least 0.00001.
7. The beverage as recited in any one of 1 to 6 above, wherein the concentration by weight of rosmarinic acid is 3 ppm to 1000 ppm.
8. The beverage as recited in any one of 1 to 7 above, wherein the ratio of the concentration by weight of cineole to the concentration by weight of rosmarinic acid is not more than 0.07.
9. The beverage as recited in any one of 1 to 8 above, wherein the ratio of the concentration by weight of camphor to the concentration by weight of rosmarinic acid is not more than 0.05.
10. The beverage as recited in any one of 1 to 9 above, which contains 1% by volume or more of ethanol.
11. The beverage as recited in any one of 1 to 10 above, wherein the dye component is a dye having an anthocyanin skeleton.
12. The beverage as recited in any one of 1 to 11 above, wherein the dye component is a tar color.
13. A method of producing a packed beverage which contains a liquid rosemary extract and a dye component, wherein the method comprises:
a step of immersing a rosemary's plant body in an aqueous solution containing 0 to 5% by volume of ethanol for a given period of time at 0 to 60° C. to obtain an immersion fluid; and
a step of removing the rosemary's plant body from the immersion fluid to obtain a supernatant.
14. The method as recited in 13 above, wherein the ethanol content of the aqueous solution is at least 0% by volume but less than 3% by volume.
15. The method as recited in 13 or 14 above, wherein the method further includes the step of concentrating the supernatant and wherein the concentration ratio is by a factor at least 10.
16. The method as recited in any one of 13 to 15 above, wherein the volume of the aqueous solution used in the immersion step is more than 0 times but not more than 20 times the weight of the rosemary's plant body.

Advantageous Effects of Invention

The present invention can inhibit the characteristic undesirable flavor of a liquid rosemary extract, for example, its undesirable smell or aftertaste while maintaining the effect of rosmarinic acid for suppressing the fading of dyes. As a result, the present invention can provide packed beverages that retain their inherent good flavor and which yet are suppressed in the fading of dyes.

In the present invention, fading is of a broad concept covering the deteriorated coloring and change in color of dyes. The term "fading" as used herein is interchangeable with the term "discoloration." Depending on the color tone, the beverage of the present invention may be such that a brilliant color is realized by mixing two or more coloring agents. In a case like this, only a certain dye may fade to cause a seeming change in color. In the present invention, even such a change in color is encompassed in the phenomenon of fading.

Fading in the present invention encompasses a fading phenomenon due to heat, as well as a fading phenomenon due to light. Fading can be checked by methods including visual inspection that are well-known to persons skilled in the art. The methods that can be applied are not particularly limited and may be exemplified by measurement of a dye's absorbance (i.e., a maximum absorption wavelength of the dye).

Note that the characteristic undesirable smell of the rosemary extract means an odor like that of soilage which is irritating to the nose, and the characteristic undesirable aftertaste of the rosemary extract means a pungent taste that lingers in the mouth.

In a further embodiment, the present invention relates to an alcoholic beverage. The alcoholic beverage provided by the present invention is outstanding in an overall aroma and taste as an alcoholic drink. The "overall aroma and taste as an alcoholic drink" herein referred to means a composite aroma and taste that is constituted by, for example, the sweetness, bitterness, complexity, body and stimulation that are characteristic of alcoholic drinks and perceived when the alcoholic beverage is drunk.

DESCRIPTION OF EMBODIMENTS

Figure 1:
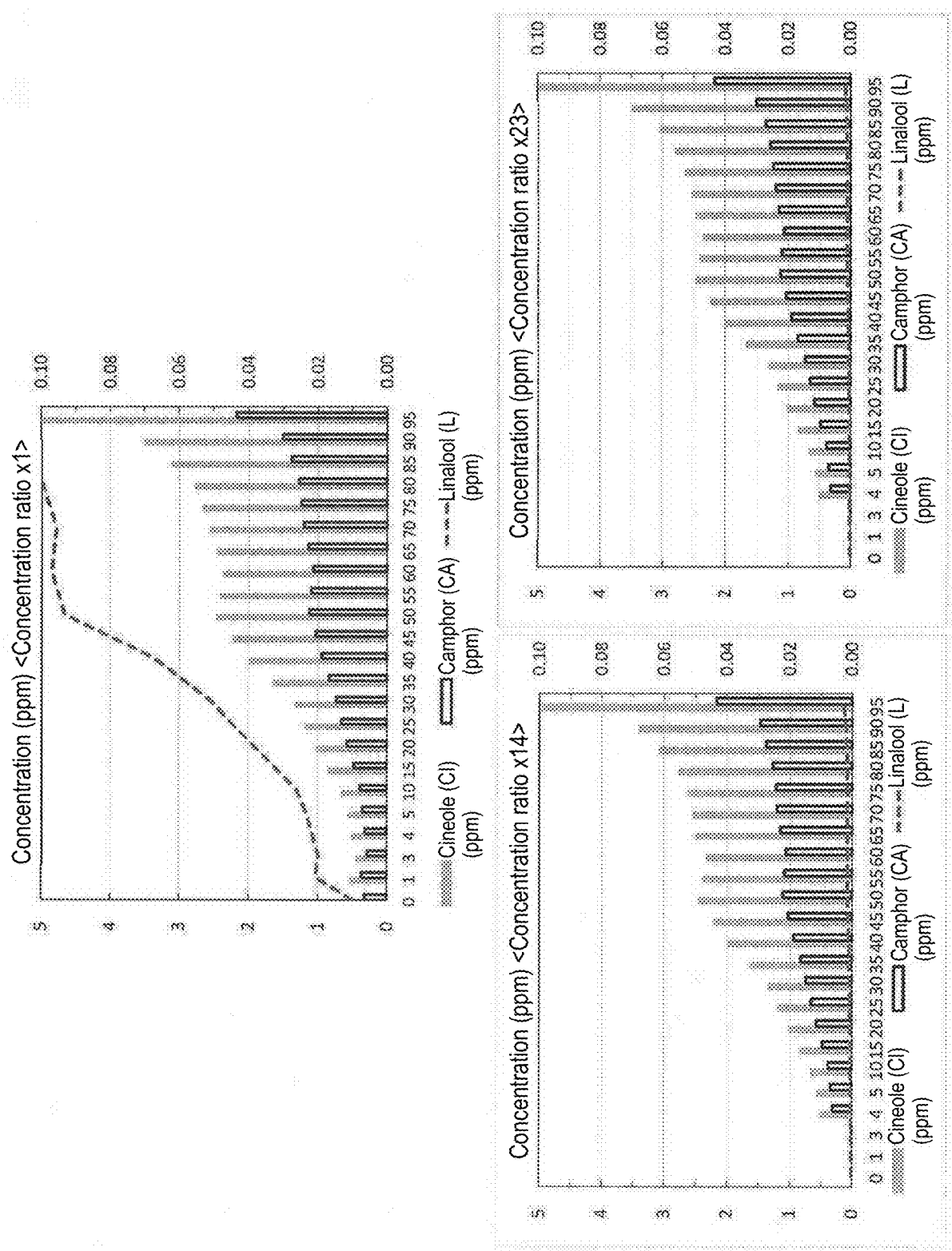
FIG. 1 shows the results of analysis of beverages to which a liquid rosemary extract was added; the horizontal axis plots the alcohol content (% by volume) of the aqueous solution used for extraction; the left vertical axis plots the concentrations (ppm) of cineole and camphor in the beverages obtained; and the right vertical axis plots the concentration (ppm) of linalool in the beverages obtained.

In one aspect, the present invention relates to a packed beverage containing rosmarinic acid, linalool and a dye component and having reduced contents of cineole and camphor.

(Rosmarinic Acid, Linalool, Camphor, and Cineole)

The beverage of the present invention contains rosmarinic acid and linalool, wherein the ratio of the sum concentration by weight of camphor and cineole to the concentration by weight of rosmarinic acid is not more than 0.10. The lower this ratio, the greater the extent by which the characteristic undesirable smell or aftertaste of rosemary is reduced. This ratio is preferably less than 0.0005, more preferably 0.0001 or less.

The concentration by weight of rosmarinic acid in the beverage of the present invention is not limited as long as it exhibits the effect of preventing fading; it is preferably 3 ppm to 1000 ppm, more preferably 3 ppm to 100 ppm.

The ratio of the concentration by weight of cineole in the beverage of the present invention to the concentration by weight of rosmarinic acid in the beverage of the present invention is not limited as long as the range set forth above is satisfied, and the ratio of interest is preferably 0.07 or less, more preferably 0.05 or less.

The ratio of the concentration by weight of camphor in the beverage of the present invention to the concentration by weight of rosmarinic acid in the beverage of the present invention in the beverage of the present invention is not limited as long as the range set forth above satisfied, and the ratio of interest is preferably 0.05 or less, more preferably 0.03 or less.

In a preferred embodiment, the concentration by weight of rosmarinic acid in the beverage of the present invention is 3 ppm to 1000 ppm, and the concentration by weight of camphor to the concentration by weight of rosmarinic acid in the beverage of the present invention is 0 to 0.008.

The ratio of the concentration by weight of linalool in the beverage of the present invention to the concentration by weight of rosmarinic acid in the beverage of the present invention is at least 0.00001. Preferably, the weight ratio of interest is at least 0.00003. There is no upper limit to the weight ratio of interest and it may, for example, be adjusted to 0.1 or less. If the weight ratio of interest is within an appropriate range, the overall aroma and taste of the beverage as an alcoholic drink will improve. Linalool is a component that is not contained in synthetic rosmarinic acid or purified rosmarinic acid.

Rosmarinic acid as referred to in the present invention (which is named (2"R")-2-[[(2"E")-3-(3,4-dihydroxyphenyl)-1-oxo-2-propenyl]]oxy]-3-(3,4-dihydroxyphenyl)propanoic acid) according to systematic nomenclature) is a compound represented by the following formula:

[Formula 1]

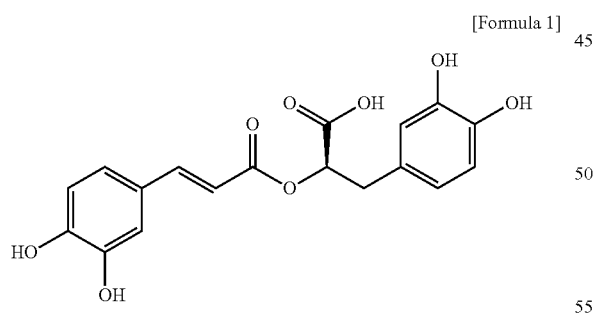

Rosmarinic acid is one of the phenolcarboxylic acids contained in herbs and it is particularly abundant in plants of the mint family Lamiaceae. Since it is structurally a dimer of phenylpropanoid, rosmarinic acid contains more phenolic hydroxyl groups than monomeric phenylpropanoids such as ferulic acid, caffeic acid and chlorogenic acid. Hence, rosmarinic acid exhibits a higher anti-oxidant activity than the monomeric phenylpropanoids. The anti-oxidant activity of rosmarinic acid can be measured using the radical (e.g. DPPH radical, superoxide anion radical, or hydroxyl radical) scavenging activity as an index. Rosmarinic acid also shows high activity for preventing photodeterioration since it has conjugated double bonds in its structure. Rosmarinic acid as referred to in the present invention encompasses not only free rosmarinic acid but also derivatives of rosmarinic acid. Examples of rosmarinic acid derivatives include, but are not limited to, rosmarinic acid glycosides having sugars such as glucose attached to the position of either one of hydroxyl groups to form glycosides. Hence, the amount of rosmarinic acid associated with the present invention is the sum amount of free rosmarinic acid and derivatives of rosmarinic acid. Preferably, rosmarinic acid is free rosmarinic acid, and the concentration by weight of rosmarinic acid in the beverage of the present invention is the concentration of free rosmarinic acid.

From the viewpoint of the need to be incorporated in beverages, rosmarinic acid as extracted from naturally occurring materials is preferably used in the present invention. Among the plants of the mint family Lamiaceae, rosemary is a rich source of rosmarinic acid, so it is preferred to use rosmarinic acid as extracted from rosemary. It is particularly preferred to use a rosmarinic acid containing liquid rosemary extract as produced by the method to be described later.

The content of rosmarinic acid can be quantified using common analytical instruments such as HPLC. The analytical column to be used for such quantification is not particularly limited and an example that may be used with advantage is a common ODS resin column. The solvent is not particularly limited, either, and examples that may be used with advantage are acetonitrile, methanol, tetrahydrofuran and other common solvents in general use. The detection method is not particularly limited, either, and common devices such as UV detectors that are in general use may be employed with advantage. A specific example for quantification is the method described in the Example to be given later.

Cineole associated with the present invention is 1,3,3-trimethyl-2-oxabicyclo[2.2.2]octane which has the following chemical structure:

[Formula 2]

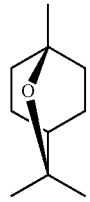

Cineole is known to be contained in an essential oil extracted from a plant of the genus *Eucalyptus*, say, *E. polybractea*.

Camphor associated with the present invention is 1,7,7-trimethylbicyclo[2.2.1]heptan-2-one. This compound is known as a main component of *Cinnamomum camphora*. An isomer of naturally occurring camphor is a D form but if the term "camphor" is used in association with the present invention, it refers not only to a D form but also to an L form and a mixture of these isomers, as well. Hence, the amount of camphor associated with the present invention is the sum amount of D and L forms.

Linalool is a kind of monoterpene alcohols. Linalool occurs in both an R form and an S form, and if the term "linalool" is used in association with the present invention, it refers not only to an R form but also to an S form and a mixture of these isomers, as well. Hence, the amount of linalool associated with the present invention is the sum amount of S and R forms.

The contents of cineole, camphor and linalool can be quantified using common analytical instruments such as GC-MS. The analytical column to be used for such quantification is not particularly limited and an example that may be used with advantage is a common DB-WAX column. The carrier gas is not particularly limited, either, and examples that may be used with advantage are helium and other common carrier gases in general use. Detection may be implemented by using a common mass detector which is in general use.

(Dye Component)

The dye component for use in the present invention may be selected from among any dyes that are permitted for use in foods and these dyes can be used without particular limitation irrespective of whether they are natural or synthetic.

Examples of natural dyes include, but are not limited to: carotenoid dyes such as annatto color, Gardenia Yellow, *Dunaliella salina* carotene, carrot carotene, palm oil carotene, tomato color, and paprika color; quinone dyes such as *Rubia tinctorum* L color, cochineal extract, *Lithospermum erythrorhizon* (Shikon) color, and Lac color; dyes having an anthocyanin skeleton such as Red cabbage color, Perilla color, Hibiscus color, grape juice color, grape skin color, Purple sweet potato color, Purple corn color, Elderberry color, and Boysenberry color; flavonoid dyes such as cacao color, Kaoliang color, sandalwood color, onion color, tamarind color, persimmon color, carob germ color, licorice color, *Caesalpinia sappan* L. color, Carthamus red and Carthamus yellow; porphyllin dyes such as chlorophyllin, chlorophyll and Spirulina color; diketonic dyes such as curcumin; azaphilonic dyes such as Monascus color; betacyanine dyes such as beat red; and others such as Monascus yellow, caramel, Gardenia blue, Gardenia red, gold, silver, aluminum, etc.

Examples of synthetic dyes include, but are not limited to: tar colors such as Red No. 2, Red No. 3, Red No. 40, Red No. 102, Red No. 104, Red No. 105, Red No. 106, Yellow No. 4, Yellow No. 5, Blue No. 1, Blue No. 2, and Green No. 3; inorganic pigments such as iron sesquioxide and titanium dioxide; natural dye derivatives such as norbixin Na•K, copper chlorophyll, copper chlorophyllin Na, and iron chlorophyllin Na; as well as synthetic coloring agents such as synthetic natural dyes exemplified by β-carotene, riboflavin, riboflavin butyrate ester, and riboflavin 5'-phosphate ester Na.

In particular, dyes having an anthocyanin skeleton and tar dyes are preferred.

While the content of a dye component in the beverage is not particularly limited, a typical range is 1 to 50 ppm.

(Alcoholic Beverage)

In a certain embodiment, the beverage of the present invention is an alcoholic beverage. Unless otherwise noted, the alcohol as herein referred to is ethyl alcohol (ethanol), and the alcohol content as herein referred to is the percentage by volume of the alcohol in an aqueous alcoholic solution.

The method for providing the ethanol that can be used in the present invention is not particularly limited. To give a few examples, brewer's alcohol, spirits (spirits such as gin, vodka, rum, tequila, and new spirits, as well as material alcohol), liquors, whiskeys (e.g., whiskey and brandy), or shouchu (multiply distilled, class A, or singly distilled, class B), as well as brewage such as sake, wine and beer) may be used as feedstock for the beverage. The alcoholic beverage of the present invention preferably has an alcohol content of at least 1% by volume, more preferably at least 5% by volume, even more preferably at least 10% by volume, and still more preferably at least 20% by volume. Even if the alcohol content exceeds 80% by volume, no particular problem will occur in terms of the effect of the invention but the product might not be preferred as a beverage.

The alcohol content of the beverage of the present invention can be measured by means of a vibrating densitometer. A sample is distilled on direct fire and the resulting distillate is measured for its density at 15° C.; the density is then converted to an alcohol content using Table 2 for Conversion between Alcohol Content and Density (15° C.)/Specific Gravity (15/15° C.) which is an annex to the Methods of Analysis Specified by the National Tax Agency (National Tax Agency Directive No. 6 for 2007, revised on Jun. 22, 2007).

(Other Components)

The beverage of the present invention may also contain carbon dioxide gas. To this end, any method that is generally known to persons skilled in the art may be employed and examples include, but are not limited to, the following: carbon dioxide is dissolved in the beverage under superatmospheric pressure; carbon dioxide and the beverage are mixed in the piping from a mixer such as a carbonator of Tuchenhagen GmbH; the beverage is sprayed into a tank filled with carbon dioxide, so that carbon dioxide is absorbed by the beverage; alternatively, the beverage and carbonated water are mixed to prepare a carbon dioxide gas containing beverage. The pressure of the carbon dioxide gas in the carbon dioxide gas containing beverage of the present invention is preferably high enough for the consumer to have a refreshing feeling that originates from the carbon dioxide gas, as exemplified by a value of 0.5 to 3.0 kgf/cm$^2$, more preferably 1.5 to 3.0 kgf/cm$^2$, as determined by a carbon dioxide gas pressure measurement method that is generally known to persons skilled in the art.

The beverage of the present invention may also contain fruit juice or vegetable juice. These may be used without any limitation as long as they are applicable to ordinary beverages. For instance, they may assume the form of either straight fruit juice (i.e., as obtained by squeezing fruit) or concentrated fruit juice. Other applicable forms include cloudy fruit juice, whole fruit juice as obtained by crushing a whole fruit inclusive of the rind and removing only seeds and other especially coarse solids, fruit pureé as obtained by straining fruit, or fruit juice as obtained by crushing or extracting a dried fruit. Also applicable is vegetable juice as obtained by modified versions of the methods for producing the above-mentioned kinds of fruit juice.

The kinds of fruit juice and vegetable juice that can be used are not particularly limited and examples include, but are not limited to the following: citrus fruit juice (e.g., orange juice, tangerine juice, grapefruit juice, lemon juice or lime juice), apple juice, grape juice, peach juice, tropical fruit juice (pineapple juice, guava juice, banana juice, mango juice, acerola juice, papaya juice, or passion fruit juice), other fruit juice (Japanese apricot juice, pear juice, apricot juice, plum juice, berry juice, or kiwi fruit juice), tomato juice, carrot juice, strawberry juice, melon juice, etc. Preferred examples include citrus fruit juice (e.g., orange juice, tangerine juice, grapefruit juice, lemon juice or lime juice), grape juice, peach juice, etc. These kinds of fruit juice and vegetable juice may be used either independently or in combination of two or more kinds.

In addition to the components described above, additives that are commonly used in beverages may be incorporated in the beverage of the present invention unless its effect will not be impaired, and examples include flavorings, vitamins, flavor enhancers, extracts, pH modifiers, quality stabilizers, etc.

(Packed Beverage)

The beverage of the present invention may be packed in a container. The type of the container is not particularly limited and any conventional type can be used, as exemplified by PET bottles and other containers molded from plastics as a major component, metal cans, paper containers laminated with metal foils or plastic films, and glass bottles; typically, the beverage of the present invention may be supplied as filled and sealed in these containers. According to the present invention, fading of dyes due, for example, to prolonged storage can be suppressed, so consumers can considerably benefit the effect of the present invention in the case of packed beverages that take a certain period of time before they are drunk after manufacture. The packed beverage of the present invention may preferably be supplied as filled in a PET bottle, more preferably in a PET bottle with a capacity of 1 to 2 liters.

(Method of Producing the Beverage)

The method of producing the packed beverage of the present invention is not particularly limited. Preferably, a liquid extract containing rosmarinic acid is obtained from a rosemary's plant body by a method comprising a step of immersing the rosemary's plant body in an aqueous solution with an ethanol content of 0% by volume to 5% by volume for a given period of time at 0 to 60° C. to obtain an immersion fluid, and a step of removing the rosemary's plant body from the immersion fluid to obtain the supernatant. Subsequently, the liquid extract obtained is mixed with other material such as an alcohol to obtain an alcoholic beverage. This method is described below.

The rosemary's plant body which is used as a feed in the immersion step is not particularly limited and commercial rosemary will serve the purpose. Rosemary, being native to the Mediterranean region, is an ever-green tree of low height that belongs to the mint family Lamiaceae. Having the Japanese name mannenrou, Chinese characters used to express rosemary are common in Japan and China. In the present invention, the rosemary's plant body may be a whole grass or any of its parts, i.e., leaves, roots, stems, flowers, fruit, and seeds. Preferably, leaves are used. In order to provide an enhanced extraction efficiency, the plant body may be shredded before use.

The ethanol content of the aqueous solution to be used in the immersion step is preferably at least 0% by volume but less than 3% by volume, more preferably from 0 to 0.01% by volume. The lower the ethanol content, the lower the ratio of the sum concentration by weight of camphor and cineole to the concentration by weight of rosmarinic acid, which is preferred for the purpose of the present invention. On the other hand, if the aqueous solution used contains ethanol at a concentration higher than 5% by volume, camphor, cineole and other components that adversely affect flavor will be extracted in increased amounts, which is not preferred for the purpose of the present invention.

The immersion temperature is preferably from 20 to 60° C. If the immersion temperature is unduly high, say, 70° C. and above, camphor, cineole and other components that adversely affect flavor will be extracted in increased amounts, which is not preferred for the purpose of the present invention.

The immersion time is preferably 1 to 3 hours, more preferably 2 to 3 hours.

The volume of the aqueous solution to be used in the immersion step is preferably greater than 0 times but not greater than 20 times, more preferably 0.01 to 10 times, even more preferably 0.1 to 5 times, the weight of the rosemary's plant body.

After the immersion fluid is obtained in the immersion step, the rosemary's plant body is removed from the immersion fluid to obtain the supernatant. The method of removing the rosemary's plant body is not limited and any known method such as filtration or centrifugation may be employed.

Depending on the case, the obtained supernatant may be concentrated. The applicable concentration ratio is preferably by a factor of at least 2, more preferably at least 10, and even more preferably at least 14. The concentration ratio has no upper limit but it may, for example, be by a factor of up to 30. The term "concentration ratio" as used herein refers to the pre-concentration volume of the immersion fluid divided by its post-concentration volume. It has been found that the amounts of cineole and camphor tend to decrease upon concentration. It should be noted here that if the solvent is completely removed by spray drying which is a method for drying a liquid to a solid by means of hot air, linalool which is a preferred component would be completely removed.

The concentration method is not particularly limited and it may be performed at either reduced or atmospheric pressure. Typical conditions for concentration may be at 0° C. to 78° C. and at 0 to 0.9 atm.

In a certain embodiment, the present invention relates to a beverage as obtained by either one of the production methods described above.

(Numerical Ranges)

For the purpose of clarification, the numerical ranges defined herein by lower and upper limits as "lower limit to upper limit" should be understood to include the lower limit and the upper limit. For instance, the range defined by "1 to 2" includes both 1 and 2.

EXAMPLES

On the pages that follow, the present invention will be described by reference to working examples but it should be understood that the present invention is by no means limited to such examples.

Experiment 1: Evaluating the flavor of liquid rosemary extract containing colored beverages as produced by using aqueous solutions of alcohol at various concentrations (1)

(Producing a Liquid Rosemary Extract)

Leaves of rosemary (produce of Spain) weighing 100 g were immersed in 1 L of an aqueous alcoholic solution with an alcohol content of 0 to 95% and stored at 50° C. for 2 hours. Thereafter, the supernatant of the aqueous alcoholic solution was transferred into a separate vessel and passed through filter paper to obtain a filtrate (liquid rosemary extract A). Subsequently, the filtrate was concentrated under reduced pressure by a factor of 14 or 23 and mixed with a spirit (95% alcohol) at a ratio of 1:1 to prepare liquid rosemary extract B with an alcohol content of 47.5%.

(Producing Colored Beverages Containing a Liquid Rosemary Extract and Dye Components)

Colored beverages were produced using liquid rosemary extract A or B. Specifically, an aliquot of liquid rosemary extract A or B was taken in such an amount that the rosmarinic acid concentration in the colored beverage would be 10 ppm; thereafter, an alcohol (in such an amount that the alcohol content in the colored beverage would be 5% by volume), water, commercial sucrose 20 g, citric anhydride 1 g, trisodium citrate 50 mg, Food Red No. 102 in solution (Food Red No. 102 weighing 0.05 mg) and Food Yellow No. 4 in a solution (Food Yellow No. 4 weighing 0.02 mg), and iron(II) chloride (in such an amount that its concentration in the colored beverage would be 1000 ppb) were added; after thorough agitation, the mixture was filled up with water to a volume of 100 ml, whereby colored beverages were prepared. Each beverage was subjected to composition analysis in the following manner.

First, the concentration of rosmarinic acid was measured. Specifically, a given amount of each beverage was subjected to HPLC and composition analysis was carried out by measuring the absorbance at 280 nm. For the measurement, a TSKgel-ODS-80TsQAC30 column and a water-acetonitrile based solvent system were used. Elution conditions were as follows: fluid A was an aqueous solution of 0.05% TFA (trifluoroacetic acid); fluid B was an aqueous solution of 0.05% TFA and 90% acetonitrile; flow rate was 1 ml/min; a linear gradient was applied with fluid B varying from 0% to 100% over a period of 30 minutes.

Cineole, camphor and linalool were analyzed for their contents by GC-MS. A DB-WAX column was used with helium being flowed as a carrier gas. The conditions for analysis were as follows.

Column: Agilent 122-7063 (DB-WAX 60 m×250 μm×0.5 μm)
  Initial oven temperature: 40° C.
  Initial temperature hold time: 3 minutes
  Post-run temperature: 250° C.
  Temperature elevation rate: 4° C./min
  Temperature set to rise to: 230° C.

For identification of compounds, comparison with commercial standard substances was made as regards UV absorption curve, retention time, etc. Quantification of compounds was made by calculation from the UV absorption intensity of each standard substance (the unit being ppm) and the results are shown in Tables 1A to 1C. In the tables, (CA+CI)/R means the ratio of the sum weight of camphor and cineole to the concentration by weight of rosmarinic acid, and L/R means the ratio of the concentration by weight of linalool to the concentration by weight of rosmarinic acid. In the tables, "extracting alcohol content" means the alcohol content of the aqueous alcoholic solution used for extraction.

(Evaluation of Colored Beverages Containing a Liquid Rosemary Extract)

For each beverage, sensory evaluation and fading test (measurement of residual dyes in percentage) were performed by the following methods.

Before measurement of residual dyes in percentage, a portion of the colored beverage was taken and subjected to sensory evaluation. Then, the values of absorbance at 510 nm and 430 nm were measured. In a separate step, the remaining colored beverage was placed in a constant-temperature (50° C.) bath where it was exposed to a fluorescent lamp (20000 lux) for 48 hours to measure the values of absorbance at 510 nm and 430 nm. The respective after-exposure values of absorbance were divided by the respective pre-exposure values of absorbance and multiplied by 100; by counting fractions of 5 and over as a unit and cutting off the rest, the percentage of residual dyes was calculated and used as a measure for evaluating how much of the colored beverages faded.

Sensory evaluation was performed by five trained panelists according to the 5-point scoring system described below. The results of evaluation by the five panelists were tallied up and their mean values were taken.

Smell (Pleasantness of Aroma):
  5 The characteristic undesirable smell is not perceived at all.
  4 The characteristic undesirable smell is not perceived.
  3 The characteristic undesired smell is not much perceived.
  2 The characteristic undesirable smell is perceived.
  1 The characteristic undesirable smell is very noticeable.

Aftertaste:
  5 Unpleasant aftertaste is not perceived at all.
  4 Unpleasant aftertaste is not perceived.
  3 Unpleasant aftertaste is not much perceived.
  2 Unpleasant aftertaste is perceived.
  1 Unpleasant aftertaste is very noticeable.

Figure 2:
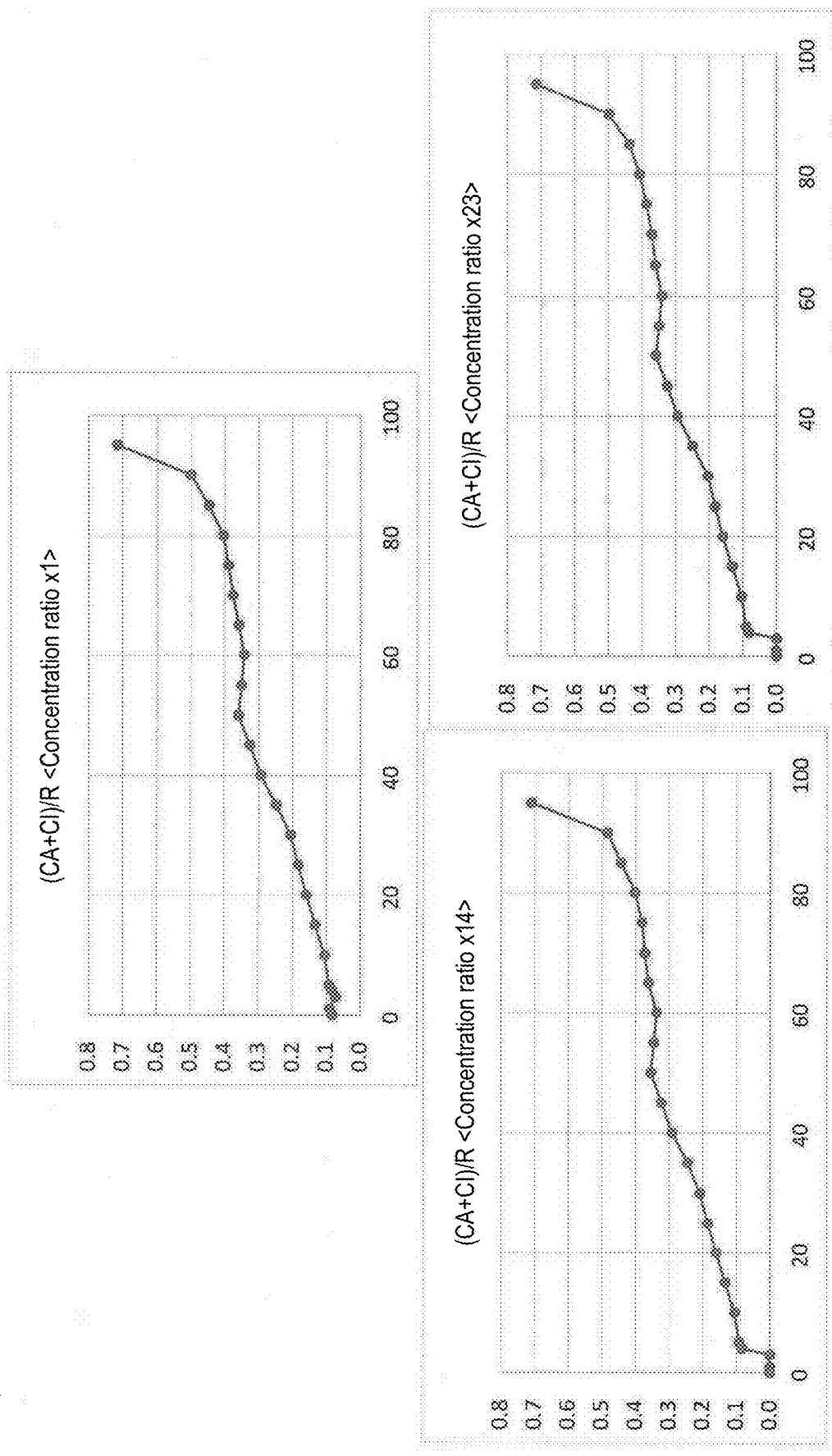
FIG. 2 shows the results of analysis of beverages to which a liquid rosemary extract was added; the horizontal axis plots the alcohol content (% by volume) of the aqueous solution used for extraction; the vertical axis plots (CA+CI)/R, or the ratio of the sum concentration by weight of camphor and cineole to the concentration by weight of rosmarinic acid.
Figure 3:
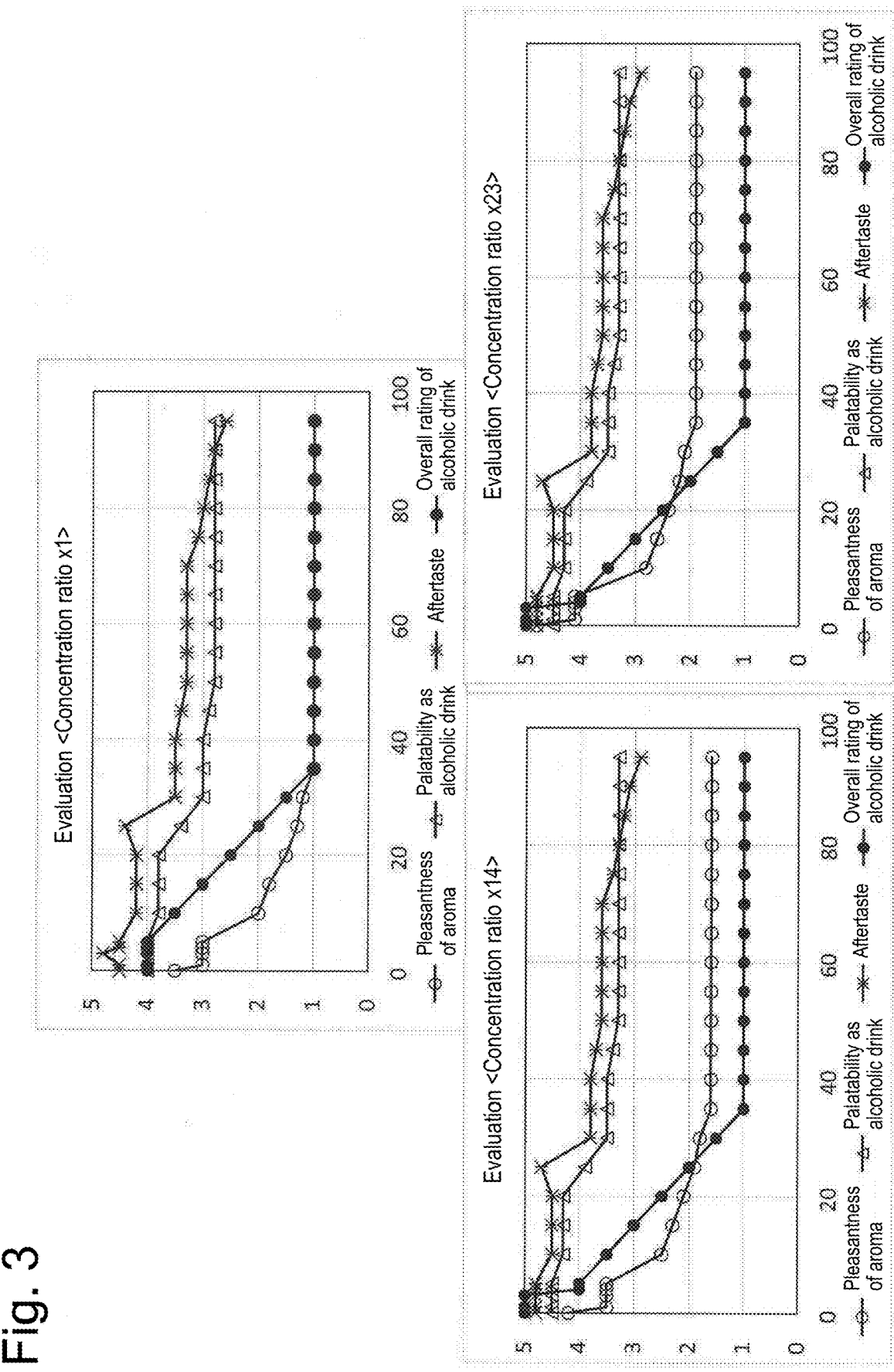
FIG. 3 shows the results of evaluation of beverages to which a liquid rosemary extract was added; the horizontal axis plots the alcohol content (% by volume) of the aqueous solution used for extraction; the vertical axis plots the scores obtained in the sensory evaluation.

Palatability as Alcoholic Drink:
  5 Very good
  4 Good
  3 Moderate
  2 Mediocre
  1 Poor Overall Rating as Alcoholic Drink:
Overall rating of aroma and taste as alcoholic drink was determined by a 5-point scoring system (from the viewpoint of a composite taste constituted by, for example, the sweetness, bitterness, complexity, body, and stimulation that are characteristic of alcoholic drinks that are perceived when an alcoholic beverage is drunk)
  5 Very good
  4 Good
  3 Moderate
  2 Mediocre
  1 Poor The results of the above evaluation are shown in Tables 1A to 1C. The corresponding graphs are shown in FIGS. 1 to 3. In the experiment using the liquid rosemary extract, an adequate effect against fading was obtained. In addition, the flavor and (CA+CI)/R of the beverages changed depending on the alcohol concentration of the aqueous solution used for extraction.

TABLE 1A

| Concentration ratio | Extracting alcohol content | Rosmarinic Acid (R) (ppm) | Cineole (CI) (ppm) | Camphor (CA) (ppm) | Linalool (L) (ppm) | (CA + CI)/R | L/R ($\times 10^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|---|---|---|---|---|---|
| 1 | 0 | 10.0 | 0.50 | 0.33 | 0.0101 | 0.083 | 10.08 | 3.5 | 4.0 | 4.5 | 4.0 | 80 | 71 |
| 1 | 1 | 10.0 | 0.53 | 0.38 | 0.0207 | 0.090 | 20.70 | 3.0 | 4.0 | 4.5 | 4.0 | 81 | 70 |
| 1 | 3 | 10.0 | 0.45 | 0.29 | 0.0200 | 0.073 | 19.98 | 3.0 | 4.0 | 4.8 | 4.0 | 81 | 72 |
| 1 | 4 | 10.0 | 0.51 | 0.32 | 0.0217 | 0.082 | 21.73 | 3.0 | 4.0 | 4.5 | 4.0 | 80 | 70 |
| 1 | 5 | 10.0 | 0.57 | 0.35 | 0.0236 | 0.092 | 23.58 | 3.0 | 4.0 | 4.5 | 4.0 | 81 | 71 |
| 1 | 10 | 10.0 | 0.66 | 0.39 | 0.0261 | 0.105 | 26.14 | 2.0 | 3.8 | 4.2 | 3.5 | 80 | 72 |

TABLE 1A-continued

| Concentration ratio | Extracting alcohol content | Rosmarinic Acid (R) (ppm) | Cineole (CI) (ppm) | Camphor (CA) (ppm) | Linalool (L) (ppm) | (CA + CI)/R | L/R (×10$^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|---|---|---|---|---|---|
| 1 | 15 | 10.0 | 0.84 | 0.48 | 0.0323 | 0.133 | 32.31 | 1.8 | 3.8 | 4.2 | 3.0 | 80 | 71 |
| 1 | 20 | 10.0 | 1.02 | 0.58 | 0.0385 | 0.160 | 38.51 | 1.5 | 3.8 | 4.2 | 2.5 | 81 | 70 |
| 1 | 25 | 10.0 | 1.18 | 0.66 | 0.0447 | 0.184 | 44.75 | 1.3 | 3.4 | 4.4 | 2.0 | 80 | 72 |
| 1 | 30 | 10.0 | 1.33 | 0.73 | 0.0505 | 0.206 | 50.46 | 1.2 | 3.0 | 3.5 | 1.5 | 80 | 71 |
| 1 | 35 | 10.0 | 1.65 | 0.84 | 0.0586 | 0.248 | 58.58 | 1.0 | 3.0 | 3.5 | 1.0 | 81 | 70 |
| 1 | 40 | 10.0 | 1.99 | 0.94 | 0.0671 | 0.293 | 67.10 | 1.0 | 3.0 | 3.5 | 1.0 | 80 | 71 |
| 1 | 45 | 10.0 | 2.23 | 1.03 | 0.0801 | 0.326 | 80.08 | 1.0 | 2.9 | 3.4 | 1.0 | 80 | 72 |
| 1 | 50 | 10.0 | 2.47 | 1.12 | 0.0931 | 0.359 | 93.14 | 1.0 | 2.8 | 3.3 | 1.0 | 80 | 73 |
| 1 | 55 | 10.0 | 2.41 | 1.10 | 0.0950 | 0.351 | 95.00 | 1.0 | 2.8 | 3.3 | 1.0 | 80 | 70 |
| 1 | 60 | 10.0 | 2.36 | 1.07 | 0.0969 | 0.343 | 96.87 | 1.0 | 2.8 | 3.3 | 1.0 | 81 | 71 |
| 1 | 65 | 10.0 | 2.45 | 1.14 | 0.0962 | 0.358 | 96.23 | 1.0 | 2.8 | 3.3 | 1.0 | 80 | 72 |
| 1 | 70 | 10.0 | 2.55 | 1.20 | 0.0956 | 0.375 | 95.56 | 1.0 | 2.8 | 3.3 | 1.0 | 80 | 70 |
| 1 | 75 | 10.0 | 2.65 | 1.24 | 0.0975 | 0.389 | 97.53 | 1.0 | 2.8 | 3.1 | 1.0 | 82 | 71 |
| 1 | 80 | 10.0 | 2.77 | 1.28 | 0.0997 | 0.404 | 99.72 | 1.0 | 2.8 | 3.0 | 1.0 | 80 | 70 |
| 1 | 85 | 10.0 | 3.09 | 1.38 | 0.1120 | 0.447 | 111.96 | 1.0 | 2.8 | 2.9 | 1.0 | 80 | 72 |
| 1 | 90 | 10.0 | 3.49 | 1.51 | 0.1274 | 0.500 | 127.43 | 1.0 | 2.8 | 2.8 | 1.0 | 81 | 71 |
| 1 | 95 | 10.0 | 4.99 | 2.17 | 0.1722 | 0.717 | 172.16 | 1.0 | 2.8 | 2.6 | 1.0 | 80 | 73 |

TABLE 1B

| Concentration ratio | Extracting alcohol content | Rosmarinic Acid (R) (ppm) | Cineole (CI) (ppm) | Camphor (CA) (ppm) | Linalool (L) (ppm) | (CA + CI)/R | L/R (×10$^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|---|---|---|---|---|---|
| 14 | 0 | 10.0 | 0.00 | 0.00 | 0.0002 | 0.000 | 0.20 | 4.2 | 4.5 | 4.8 | 5.0 | 81 | 72 |
| 14 | 1 | 10.0 | 0.00 | 0.00 | 0.0003 | 0.000 | 0.33 | 3.5 | 4.5 | 4.8 | 5.0 | 81 | 70 |
| 14 | 3 | 10.0 | 0.00 | 0.00 | 0.0003 | 0.000 | 0.32 | 3.5 | 4.5 | 4.8 | 5.0 | 81 | 70 |
| 14 | 4 | 10.0 | 0.51 | 0.32 | 0.0004 | 0.083 | 0.35 | 3.5 | 4.5 | 4.8 | 4.0 | 80 | 70 |
| 14 | 5 | 10.0 | 0.57 | 0.35 | 0.0004 | 0.092 | 0.38 | 3.5 | 4.5 | 4.8 | 4.0 | 81 | 70 |
| 14 | 10 | 10.0 | 0.66 | 0.39 | 0.0004 | 0.105 | 0.42 | 2.5 | 4.3 | 4.5 | 3.5 | 80 | 70 |
| 14 | 15 | 10.0 | 0.84 | 0.48 | 0.0005 | 0.132 | 0.52 | 2.3 | 4.3 | 4.5 | 3.0 | 80 | 71 |
| 14 | 20 | 10.0 | 1.02 | 0.58 | 0.0006 | 0.159 | 0.62 | 2.1 | 4.3 | 4.5 | 2.5 | 81 | 71 |
| 14 | 25 | 10.0 | 1.19 | 0.66 | 0.0007 | 0.185 | 0.72 | 1.9 | 3.9 | 4.7 | 2.0 | 80 | 70 |
| 14 | 30 | 10.0 | 1.34 | 0.74 | 0.0008 | 0.208 | 0.82 | 1.8 | 3.5 | 3.8 | 1.5 | 80 | 71 |
| 14 | 35 | 10.0 | 1.63 | 0.83 | 0.0009 | 0.245 | 0.93 | 1.6 | 3.5 | 3.8 | 1.0 | 81 | 70 |
| 14 | 40 | 10.0 | 1.98 | 0.94 | 0.0010 | 0.293 | 1.04 | 1.6 | 3.5 | 3.8 | 1.0 | 80 | 70 |
| 14 | 45 | 10.0 | 2.21 | 1.03 | 0.0013 | 0.324 | 1.28 | 1.6 | 3.4 | 3.7 | 1.0 | 80 | 71 |
| 14 | 50 | 10.0 | 2.44 | 1.11 | 0.0015 | 0.356 | 1.49 | 1.6 | 3.3 | 3.6 | 1.0 | 80 | 70 |
| 14 | 55 | 10.0 | 2.39 | 1.09 | 0.0015 | 0.347 | 1.51 | 1.6 | 3.3 | 3.6 | 1.0 | 80 | 71 |
| 14 | 60 | 10.0 | 2.33 | 1.06 | 0.0015 | 0.339 | 1.54 | 1.6 | 3.3 | 3.6 | 1.0 | 81 | 70 |
| 14 | 65 | 10.0 | 2.48 | 1.15 | 0.0016 | 0.363 | 1.57 | 1.6 | 3.3 | 3.6 | 1.0 | 80 | 71 |
| 14 | 70 | 10.0 | 2.54 | 1.20 | 0.0015 | 0.374 | 1.53 | 1.6 | 3.3 | 3.6 | 1.0 | 80 | 72 |
| 14 | 75 | 10.0 | 2.61 | 1.22 | 0.0015 | 0.383 | 1.54 | 1.6 | 3.3 | 3.4 | 1.0 | 82 | 71 |
| 14 | 80 | 10.0 | 2.76 | 1.27 | 0.0016 | 0.403 | 1.64 | 1.6 | 3.3 | 3.3 | 1.0 | 80 | 71 |
| 14 | 85 | 10.0 | 3.09 | 1.38 | 0.0018 | 0.446 | 1.80 | 1.6 | 3.3 | 3.2 | 1.0 | 80 | 70 |
| 14 | 90 | 10.0 | 3.39 | 1.47 | 0.0020 | 0.486 | 1.99 | 1.6 | 3.3 | 3.1 | 1.0 | 81 | 70 |
| 14 | 95 | 10.0 | 4.97 | 2.16 | 0.0028 | 0.713 | 2.76 | 1.6 | 3.3 | 2.9 | 1.0 | 80 | 70 |

TABLE 1C

| Concentration ratio | Extracting alcohol content | Rosmarinic Acid (R) (ppm) | Cineole (CI) (ppm) | Camphor (CA) (ppm) | Linalool (L) (ppm) | (CA + CI)/R | L/R (×10$^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|---|---|---|---|---|---|
| 23 | 0 | 10.0 | 0.00 | 0.00 | 0.0001 | 0.000 | 0.10 | 4.8 | 4.5 | 4.8 | 5.0 | 80 | 71 |
| 23 | 1 | 10.0 | 0.00 | 0.00 | 0.0002 | 0.000 | 0.22 | 4.1 | 4.5 | 4.8 | 5.0 | 81 | 70 |
| 23 | 3 | 10.0 | 0.00 | 0.00 | 0.0002 | 0.000 | 0.21 | 4.1 | 4.5 | 4.8 | 5.0 | 81 | 70 |
| 23 | 4 | 10.0 | 0.51 | 0.32 | 0.0002 | 0.083 | 0.23 | 4.1 | 4.5 | 4.8 | 4.0 | 80 | 70 |
| 23 | 5 | 10.0 | 0.57 | 0.35 | 0.0002 | 0.092 | 0.25 | 4.1 | 4.5 | 4.8 | 4.0 | 81 | 71 |
| 23 | 10 | 10.0 | 0.66 | 0.39 | 0.0003 | 0.105 | 0.27 | 2.8 | 4.3 | 4.5 | 3.5 | 80 | 71 |
| 23 | 15 | 10.0 | 0.83 | 0.48 | 0.0003 | 0.132 | 0.33 | 2.6 | 4.3 | 4.5 | 3.0 | 80 | 70 |

TABLE 1C-continued

| Concentration ratio | Extracting alcohol content | Rosmarinic Acid (R) (ppm) | Cineole (CI) (ppm) | Camphor (CA) (ppm) | Linalool (L) (ppm) | (CA + CI)/R | L/R (×10⁻⁴) | Pleasantness of aroma | Palatability as alcoholic drink | Aftertaste | Overall rating of alcoholic drink | Residual red dye (%) | Residual yellow dye (%) |
|---|---|---|---|---|---|---|---|---|---|---|---|---|---|
| 23 | 20 | 10.0 | 1.02 | 0.58 | 0.0004 | 0.160 | 0.40 | 2.4 | 4.3 | 4.5 | 2.5 | 81 | 70 |
| 23 | 25 | 10.0 | 1.17 | 0.66 | 0.0005 | 0.182 | 0.46 | 2.2 | 3.9 | 4.7 | 2.0 | 80 | 70 |
| 23 | 30 | 10.0 | 1.31 | 0.73 | 0.0005 | 0.204 | 0.52 | 2.1 | 3.5 | 3.8 | 1.5 | 80 | 70 |
| 23 | 35 | 10.0 | 1.66 | 0.84 | 0.0006 | 0.251 | 0.62 | 1.9 | 3.5 | 3.8 | 1.0 | 81 | 70 |
| 23 | 40 | 10.0 | 2.00 | 0.95 | 0.0007 | 0.295 | 0.71 | 1.9 | 3.5 | 3.8 | 1.0 | 80 | 71 |
| 23 | 45 | 10.0 | 2.22 | 1.03 | 0.0008 | 0.326 | 0.84 | 1.9 | 3.4 | 3.7 | 1.0 | 80 | 70 |
| 23 | 50 | 10.0 | 2.48 | 1.12 | 0.0010 | 0.360 | 0.97 | 1.9 | 3.3 | 3.6 | 1.0 | 80 | 70 |
| 23 | 55 | 10.0 | 2.41 | 1.10 | 0.0010 | 0.351 | 0.99 | 1.9 | 3.3 | 3.6 | 1.0 | 80 | 70 |
| 23 | 60 | 10.0 | 2.35 | 1.07 | 0.0010 | 0.342 | 1.01 | 1.9 | 3.3 | 3.6 | 1.0 | 81 | 70 |
| 23 | 65 | 10.0 | 2.47 | 1.14 | 0.0010 | 0.361 | 1.01 | 1.9 | 3.3 | 3.6 | 1.0 | 80 | 70 |
| 23 | 70 | 10.0 | 2.53 | 1.20 | 0.0010 | 0.372 | 0.29 | 1.9 | 3.3 | 3.6 | 1.0 | 80 | 70 |
| 23 | 75 | 10.0 | 2.65 | 1.24 | 0.0010 | 0.388 | 1.02 | 1.9 | 3.3 | 3.4 | 1.0 | 82 | 72 |
| 23 | 80 | 10.0 | 2.80 | 1.29 | 0.0011 | 0.409 | 1.05 | 1.9 | 3.3 | 3.3 | 1.0 | 80 | 70 |
| 23 | 85 | 10.0 | 3.03 | 1.35 | 0.0011 | 0.439 | 1.15 | 1.9 | 3.3 | 3.2 | 1.0 | 80 | 70 |
| 23 | 90 | 10.0 | 3.49 | 1.51 | 0.0013 | 0.499 | 1.33 | 1.9 | 3.3 | 3.1 | 1.0 | 81 | 70 |
| 23 | 95 | 10.0 | 4.99 | 2.17 | 0.0018 | 0.715 | 1.75 | 1.9 | 3.3 | 2.9 | 1.0 | 80 | 70 |

Experiment 2: Evaluating the flavor of liquid rosemary extract containing colored beverages as produced under varying immersion temperature and time conditions (2)

Figure 4:
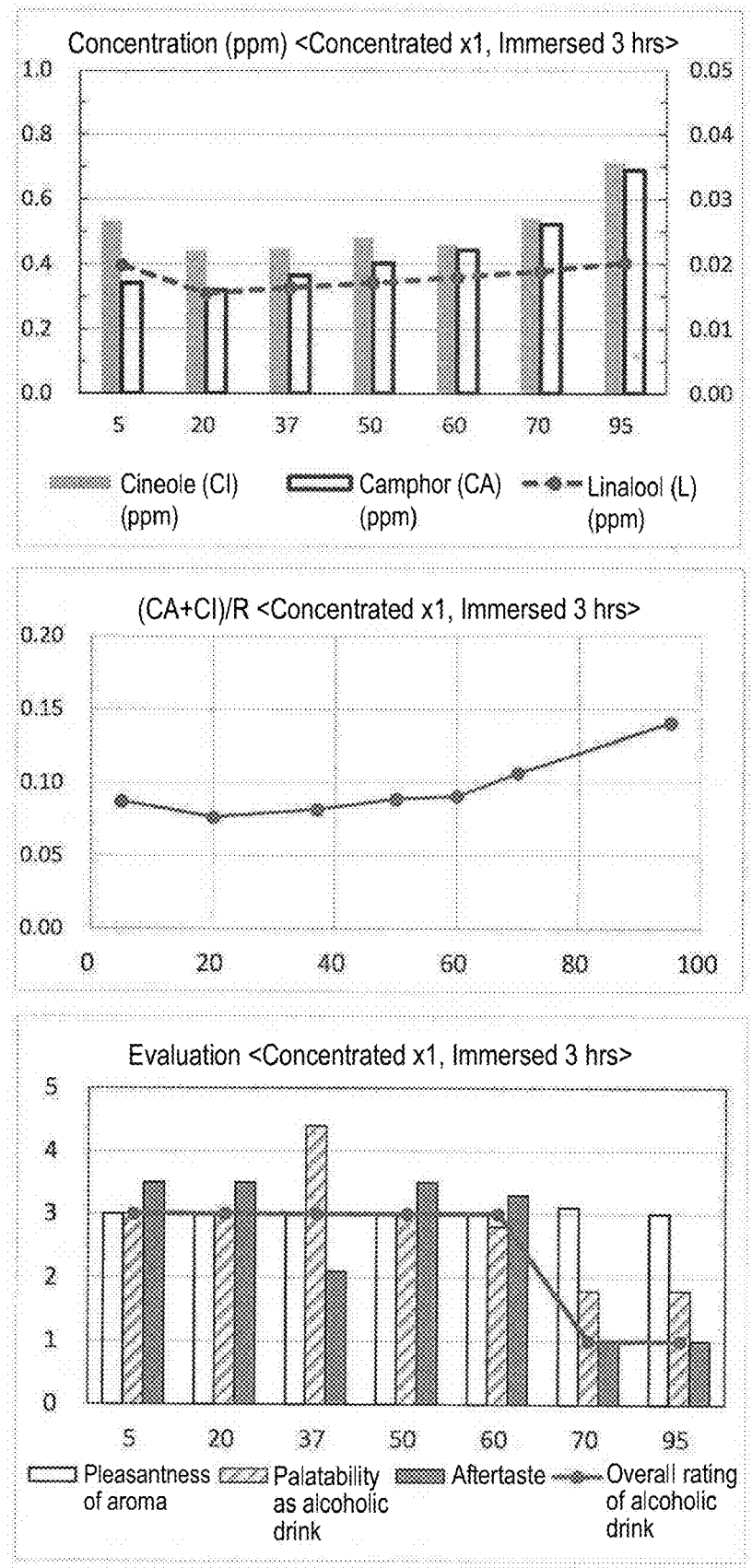
FIG. 4 shows the results of analysis and sensory evaluation of beverages to which a liquid rosemary extract was added, with the concentration ratio being by a factor of 1; in all graphs, the horizontal axis plots the extraction temperature (° C.); in the top graph, the left vertical axis plots the concentrations (ppm) of cineole and camphor in the beverages, and the right vertical axis plots the concentration (ppm) of linalool in the beverages; in the center graph, the vertical axis plots (CA+CI)/R, or the ratio of the sum concentration by weight of camphor and cineole to the concentration by weight of rosmarinic acid; in the bottom graph, the vertical axis plots the scores obtained in the sensory evaluation.

First, liquid rosemary extracts and beverages were produced, analyzed and evaluated by the same method as in Experiment 1 except that the immersion time was set to 3 hours and the immersion temperature was changed. The liquid extracts were not concentrated. The conditions of the experiment and its results are shown in Table 2 below. The corresponding graph is shown in FIG. 4. The flavor and (CA+CI)/R of the beverages changed depending on the immersion temperature.

TABLE 2

| Extracting alcohol content | Concentration ratio | Immersion Time (h) | Immersion temperature (° C.) | Rosmarinic Acid (R) (ppm) | Cineole (CI) (ppm) | Camphor (CA) (ppm) | Linalool (L) (ppm) | (CA + CI)/R |
|---|---|---|---|---|---|---|---|---|
| 0 | 1 | 3.0 | 5 | 10.0 | 0.5303 | 0.3418 | 0.0198 | 0.08721 |
| 0 | 1 | 3.0 | 20 | 10.0 | 0.4438 | 0.3194 | 0.0155 | 0.07632 |
| 0 | 1 | 3.0 | 37 | 10.0 | 0.4491 | 0.3649 | 0.0164 | 0.08141 |
| 0 | 1 | 3.0 | 50 | 10.0 | 0.4845 | 0.4030 | 0.0171 | 0.08874 |
| 0 | 1 | 3.0 | 60 | 10.0 | 0.4624 | 0.4453 | 0.0179 | 0.09077 |
| 0 | 1 | 3.0 | 70 | 10.0 | 0.5415 | 0.5244 | 0.0189 | 0.10659 |
| 0 | 1 | 3.0 | 95 | 10.0 | 0.7129 | 0.6899 | 0.0201 | 0.14029 |

| Extracting alcohol content | L/R (×10⁻⁴) | Pleasantness of aroma | Palatability as alcoholic drink | Aftertaste | Overall rating of alcoholic drink | Residual red dye (%) | Residual yellow dye (%) |
|---|---|---|---|---|---|---|---|
| 0 | 19.80 | 3.0 | 3.0 | 3.5 | 3.0 | 82 | 71 |
| 0 | 15.48 | 3.0 | 3.0 | 3.5 | 3.0 | 80 | 70 |
| 0 | 16.38 | 3.0 | 4.4 | 2.1 | 3.0 | 81 | 70 |
| 0 | 17.08 | 3.0 | 3.0 | 3.5 | 3.0 | 80 | 72 |
| 0 | 17.93 | 3.0 | 2.8 | 3.3 | 3.0 | 80 | 70 |
| 0 | 18.89 | 3.1 | 1.8 | 1.0 | 1.0 | 80 | 70 |
| 0 | 20.14 | 3.0 | 1.8 | 1.0 | 1.0 | 80 | 72 |

Then, the immersion temperature was set to 60° C. and below whereas the immersion time was varied. The concentration ratio of the liquid extract was by factors of 14 and 23. Aside from these conditions, the same method was applied as in Experiment 1. The conditions of the experiment and its results are shown in Tables 3A and 3B below. Generally, (CA+CI)/R was at low levels and the results of sensory evaluation were also satisfactory.

TABLE 3A

| Extracting alcohol content | Concentration ratio | Immersion Time (h) | Immersion temperature (° C.) | Rosmarinic Acid (R) (ppm) | Cineole (CI) (ppm) | Camphor (CA) (ppm) | Linalool (L) (ppm) | (CA + CI)/R |
|---|---|---|---|---|---|---|---|---|
| 0 | 14 | 0.5 | 5 | 10.0 | 0.0000 | 0.0000 | 0.0015 | 0.00000 |
| 0 | 14 | 0.5 | 20 | 10.0 | 0.0000 | 0.0000 | 0.0002 | 0.00000 |
| 0 | 14 | 0.5 | 37 | 10.0 | 0.0000 | 0.0000 | 0.0002 | 0.00000 |
| 0 | 14 | 0.5 | 50 | 10.0 | 0.0000 | 0.0000 | 0.0002 | 0.00000 |
| 0 | 14 | 0.5 | 60 | 10.0 | 0.0000 | 0.0000 | 0.0003 | 0.00000 |
| 0 | 14 | 1.0 | 5 | 10.0 | 0.0000 | 0.0000 | 0.0003 | 0.00000 |
| 0 | 14 | 1.0 | 20 | 10.0 | 0.0000 | 0.0000 | 0.0002 | 0.00000 |
| 0 | 14 | 1.0 | 37 | 10.0 | 0.0000 | 0.0000 | 0.0002 | 0.00000 |
| 0 | 14 | 1.0 | 50 | 10.0 | 0.0000 | 0.0000 | 0.0002 | 0.00000 |
| 0 | 14 | 1.0 | 60 | 10.0 | 0.0000 | 0.0000 | 0.0002 | 0.00000 |
| 0 | 14 | 2.0 | 5 | 10.0 | 0.0000 | 0.0000 | 0.0003 | 0.00000 |
| 0 | 14 | 2.0 | 20 | 10.0 | 0.0000 | 0.0000 | 0.0002 | 0.00000 |
| 0 | 14 | 2.0 | 37 | 10.0 | 0.0000 | 0.0000 | 0.0002 | 0.00000 |
| 0 | 14 | 2.0 | 50 | 10.0 | 0.0000 | 0.0000 | 0.0003 | 0.00000 |
| 0 | 14 | 2.0 | 60 | 10.0 | 0.0000 | 0.0000 | 0.0003 | 0.00000 |
| 0 | 14 | 3.0 | 5 | 10.0 | 0.0000 | 0.0000 | 0.0003 | 0.00000 |
| 0 | 14 | 3.0 | 20 | 10.0 | 0.0000 | 0.0000 | 0.0003 | 0.00000 |
| 0 | 14 | 3.0 | 37 | 10.0 | 0.0000 | 0.0000 | 0.0003 | 0.00000 |
| 0 | 14 | 3.0 | 50 | 10.0 | 0.0000 | 0.0000 | 0.0003 | 0.00000 |
| 0 | 14 | 3.0 | 60 | 10.0 | 0.0000 | 0.0000 | 0.0003 | 0.00000 |

| Extracting alcohol content | L/R ($\times 10^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|
| 0 | 1.55 | 3.5 | 4.5 | 4.8 | 5.0 | 81 | 70 |
| 0 | 0.24 | 3.5 | 4.5 | 4.8 | 5.0 | 81 | 70 |
| 0 | 0.24 | 3.5 | 4.6 | 4.8 | 5.0 | 80 | 70 |
| 0 | 0.24 | 3.5 | 4.3 | 4.5 | 5.0 | 80 | 70 |
| 0 | 0.26 | 3.5 | 4.6 | 4.9 | 5.0 | 81 | 70 |
| 0 | 0.29 | 3.5 | 4.5 | 4.8 | 5.0 | 80 | 70 |
| 0 | 0.23 | 3.5 | 4.5 | 4.8 | 5.0 | 81 | 70 |
| 0 | 0.24 | 3.5 | 4.6 | 3.8 | 5.0 | 81 | 70 |
| 0 | 0.24 | 3.5 | 4.6 | 4.7 | 5.0 | 81 | 70 |
| 0 | 0.24 | 3.5 | 4.7 | 4.9 | 5.0 | 80 | 70 |
| 0 | 0.27 | 3.5 | 4.5 | 4.8 | 5.0 | 80 | 70 |
| 0 | 0.20 | 3.5 | 4.5 | 4.8 | 5.0 | 81 | 71 |
| 0 | 0.25 | 3.5 | 4.5 | 2.3 | 5.0 | 80 | 70 |
| 0 | 0.25 | 4.0 | 4.5 | 4.6 | 5.0 | 80 | 70 |
| 0 | 0.25 | 3.5 | 4.5 | 3.3 | 5.0 | 81 | 70 |
| 0 | 0.31 | 3.5 | 4.5 | 4.8 | 5.0 | 82 | 71 |
| 0 | 0.25 | 3.5 | 4.5 | 4.8 | 5.0 | 81 | 70 |
| 0 | 0.26 | 3.5 | 4.5 | 2.4 | 5.0 | 81 | 71 |
| 0 | 0.27 | 3.5 | 4.5 | 4.8 | 5.0 | 80 | 70 |
| 0 | 0.29 | 3.5 | 4.3 | 3.6 | 5.0 | 80 | 70 |

TABLE 3B

| Extracting alcohol content | Concentration ratio | Immersion Time (h) | Immersion temperature (° C.) | Rosmarinic Acid (R) (ppm) | Cineole (CI) (ppm) | Camphor (CA) (ppm) | Linalool (L) (ppm) | (CA + CI)/R |
|---|---|---|---|---|---|---|---|---|
| 0 | 23 | 0.5 | 5 | 10.0 | 0.0000 | 0.0000 | 0.0010 | 0.00000 |
| 0 | 23 | 0.5 | 20 | 10.0 | 0.0000 | 0.0000 | 0.0002 | 0.00000 |
| 0 | 23 | 0.5 | 37 | 10.0 | 0.0000 | 0.0000 | 0.0002 | 0.00000 |
| 0 | 23 | 0.5 | 50 | 10.0 | 0.0000 | 0.0000 | 0.0002 | 0.00000 |
| 0 | 23 | 0.5 | 60 | 10.0 | 0.0000 | 0.0000 | 0.0002 | 0.00000 |
| 0 | 23 | 1.0 | 5 | 10.0 | 0.0000 | 0.0000 | 0.0002 | 0.00000 |
| 0 | 23 | 1.0 | 20 | 10.0 | 0.0000 | 0.0000 | 0.0002 | 0.00000 |
| 0 | 23 | 1.0 | 37 | 10.0 | 0.0000 | 0.0000 | 0.0002 | 0.00000 |
| 0 | 23 | 1.0 | 50 | 10.0 | 0.0000 | 0.0000 | 0.0001 | 0.00000 |
| 0 | 23 | 1.0 | 60 | 10.0 | 0.0000 | 0.0000 | 0.0002 | 0.00000 |
| 0 | 23 | 2.0 | 5 | 10.0 | 0.0000 | 0.0000 | 0.0002 | 0.00000 |
| 0 | 23 | 2.0 | 20 | 10.0 | 0.0000 | 0.0000 | 0.0001 | 0.00000 |
| 0 | 23 | 2.0 | 37 | 10.0 | 0.0000 | 0.0000 | 0.0002 | 0.00000 |
| 0 | 23 | 2.0 | 50 | 10.0 | 0.0000 | 0.0000 | 0.0002 | 0.00000 |
| 0 | 23 | 2.0 | 60 | 10.0 | 0.0000 | 0.0000 | 0.0002 | 0.00000 |
| 0 | 23 | 3.0 | 5 | 10.0 | 0.0000 | 0.0000 | 0.0002 | 0.00000 |

TABLE 3B-continued

| | | | | | | | | |
|---|---|---|---|---|---|---|---|---|
| 0 | 23 | 3.0 | 20 | 10.0 | 0.0000 | 0.0000 | 0.0002 | 0.00000 |
| 0 | 23 | 3.0 | 37 | 10.0 | 0.0000 | 0.0000 | 0.0002 | 0.00000 |
| 0 | 23 | 3.0 | 50 | 10.0 | 0.0000 | 0.0000 | 0.0002 | 0.00000 |
| 0 | 23 | 3.0 | 60 | 10.0 | 0.0000 | 0.0000 | 0.0002 | 0.00000 |

| Extracting alcohol content | L/R ($\times 10^{-4}$) | Pleasantness of aroma | Palatability as alcoholic drink | Aftertaste | Overall rating of alcoholic drink | Residual red dye (%) | Residual yellow dye (%) |
|---|---|---|---|---|---|---|---|
| 0 | 0.97 | 4.1 | 4.5 | 4.8 | 5.0 | 81 | 71 |
| 0 | 0.15 | 4.1 | 4.5 | 4.8 | 5.0 | 80 | 71 |
| 0 | 0.16 | 4.1 | 4.6 | 4.8 | 5.0 | 81 | 70 |
| 0 | 0.16 | 4.1 | 4.3 | 4.5 | 5.0 | 81 | 71 |
| 0 | 0.17 | 4.1 | 4.6 | 4.9 | 5.0 | 80 | 70 |
| 0 | 0.18 | 4.1 | 4.5 | 4.8 | 5.0 | 80 | 71 |
| 0 | 0.15 | 4.1 | 4.5 | 4.8 | 5.0 | 80 | 70 |
| 0 | 0.16 | 4.1 | 3.4 | 3.8 | 5.0 | 80 | 70 |
| 0 | 0.15 | 4.1 | 4.6 | 4.7 | 5.0 | 80 | 70 |
| 0 | 0.16 | 4.1 | 4.7 | 4.9 | 5.0 | 81 | 70 |
| 0 | 0.18 | 4.1 | 4.5 | 4.8 | 5.0 | 80 | 70 |
| 0 | 0.13 | 4.1 | 4.5 | 4.8 | 5.0 | 81 | 70 |
| 0 | 0.16 | 4.1 | 3.0 | 2.3 | 5.0 | 80 | 70 |
| 0 | 0.17 | 4.6 | 4.5 | 4.6 | 5.0 | 81 | 70 |
| 0 | 0.17 | 4.1 | 4.5 | 3.3 | 5.0 | 80 | 70 |
| 0 | 0.21 | 4.1 | 4.5 | 4.8 | 5.0 | 82 | 70 |
| 0 | 0.16 | 4.1 | 4.5 | 4.8 | 5.0 | 80 | 71 |
| 0 | 0.17 | 4.1 | 4.5 | 2.4 | 5.0 | 80 | 70 |
| 0 | 0.18 | 4.1 | 4.5 | 4.8 | 5.0 | 80 | 70 |
| 0 | 0.19 | 4.1 | 4.3 | 3.6 | 5.0 | 80 | 70 |

The invention claimed is:

1. A packed beverage comprising rosmarinic acid, linalool, and a dye component, wherein the ratio of the sum concentration by weight of camphor and cineole to the concentration by weight of rosmarinic acid is less than 0.0005, and wherein the ratio of the concentration by weight of linalool to the concentration by weight of rosmarinic acid is at least 0.00001.

2. A packed beverage which contains comprising a liquid rosemary extract and a dye component,
    wherein the ratio of the sum concentration by weight of camphor and cineole to the concentration by weight of rosmarinic acid in the packed beverage is less than 0.0005,
    wherein the ratio of the concentration by weight of linalool to the concentration by weight of rosmarinic acid in the packed beverage is at least 0.00001, and
    wherein the liquid rosemary extract is obtained by a method comprising:
    a step of immersing a rosemary's plant body in an aqueous solution containing 0 to 5% by volume of ethanol for a given period of time at 0 to 60° C. to obtain an immersion fluid;
    a step of removing the rosemary's plant body from the immersion fluid to obtain a supernatant; and
    a step of concentrating the supernatant, wherein the concentration factor is at least 10.

3. The beverage according to claim 1, wherein the concentration by weight of rosmarinic acid is 3 ppm to 1000 ppm.

4. The beverage according to claim 1, wherein the ratio of the concentration by weight of cineole to the concentration by weight of rosmarinic acid is not more than 0.07.

5. The beverage according to claim 1, wherein the ratio of the concentration by weight of camphor to the concentration by weight of rosmarinic acid is not more than 0.05.

6. The beverage according to claim 1, further comprising 1% by volume or more of ethanol.

7. The beverage according to claim 1, wherein the dye component is a dye having an anthocyanin skeleton.

8. The beverage according to claim 1, wherein the dye component is a tar color.

9. The beverage according to claim 2, wherein the ethanol content of the aqueous solution is at least 0% by volume but less than 3% by volume.

10. The beverage according to claim 2, wherein the volume of the aqueous solution used in the immersion step is more than 0 times but not more than 20 times the weight of the rosemary's plant body.

11. A method of producing a packed beverage which contains comprising a liquid rosemary extract and a dye component, wherein the method comprises:
    obtaining the liquid rosemary extract by (i) a step of immersing a rosemary's plant body in an aqueous solution containing 0 to 5% by volume of ethanol for a given period of time at 0 to 60° C. to obtain an immersion fluid; (ii) a step of removing the rosemary's plant body from the immersion fluid to obtain a supernatant; and (iii) a step of concentrating the supernatant, wherein the concentration factor is at least 10, and
    mixing the liquid rosemary extract and the dye component to obtain the packed beverage,
    wherein the ratio of the sum concentration by weight of camphor and cineole to the concentration by weight of rosmarinic acid is less than 0.0005, and wherein the ratio of the concentration by weight of linalool to the concentration by weight of rosmarinic acid is at least 0.00001.

12. The method according to claim 11, wherein the ethanol content of the aqueous solution is at least 0% by volume but less than 3% by volume.

13. The method according to claim 11, wherein the volume of the aqueous solution used in the immersion step is more than 0 times but not more than 20 times the weight of the rosemary's plant body.

* * * * *